W. L. MARR.
BALANCE STEERING PLANE FOR AEROPLANES.
APPLICATION FILED JULY 2, 1910.

1,059,480.

Patented Apr. 22, 1913.

Witnesses
A. M. Shannon
A. M. Dow

Inventor
Walter L. Marr
By
Attorneys

UNITED STATES PATENT OFFICE.

WALTER L. MARR, OF FLINT, MICHIGAN.

BALANCE STEERING-PLANE FOR AEROPLANES.

1,059,480.  Specification of Letters Patent.  Patented Apr. 22, 1913.

Application filed July 2, 1910. Serial No. 570,135.

*To all whom it may concern:*

Be it known that I, WALTER L. MARR, a citizen of the United States of America, residing at Flint, in the county of Genesee and State of Michigan, have invented certain new and useful Improvements in Balance Steering-Planes for Aeroplanes, of which the following is a specification, reference being had therein to the accompanying drawings.

In the manipulation of aeroplanes it is desirable to raise or lower either end of the frame independently and it is also important to be able to swing one end of the machine on the other as a pivot.

This invention relates to a balance and a steering plane for aeroplanes and to an arrangement thereof whereby the machine may be raised or depressed bodily or at either end independently, and whereby the operator may swing the machine if desired.

The invention consists in the matters hereinafter set forth, and more particularly pointed out in the appended claims.

Figure 1:
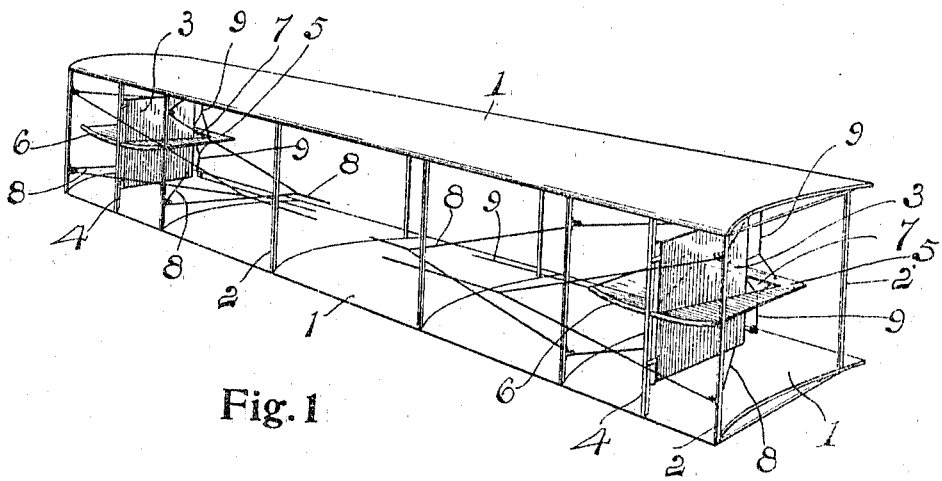
Figure 2:
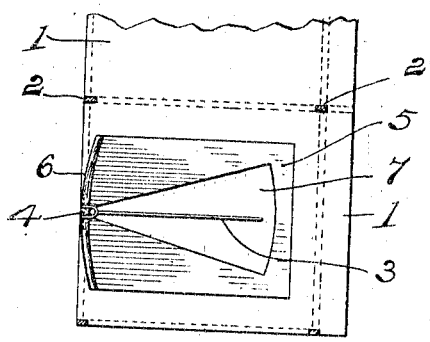

In the drawings, Figure 1 is a view of the main planes and frame work of an aeroplane provided with balance and steering planes that embodies features of the invention; Fig. 2 is a plan view of the balance and the steering plane; and Fig. 3 is a plan view of a modification thereof.

As shown herein, one or more main planes 1 of an aero-plane are secured to the laterally extending frame work 2 of the machine by which they are sustained in parallel relation at a fixed inclination to the line of flight by suitable struts. A pair of balance and steering planes are secured near the extremities of the main planes. As herein indicated a rudder member 3 is pivoted at its forward margin to a member 4 of the frame to swing in planes that are substantially vertical to the main planes. A balance member 5 is pivotally secured at its forward end to a rod 6 or like part secured at right angles to the member 4 that serves as an axis for the rudder plane 3. A segmental aperture indicated at 7 in the balance plane permits the oscillation of the rudder member. Suitably disposed flexible connections 8 running toward the operator's station permit the manipulation of the rudder members and other flexible connections 9 are used to give the required angle of inclination to the balance planes.

Figure 3:
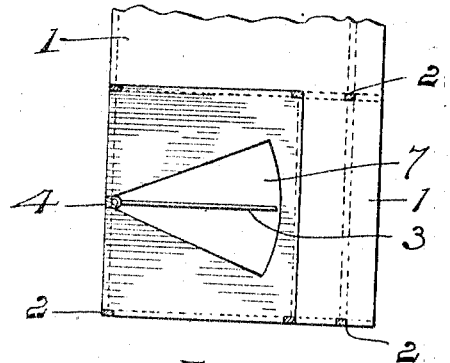

As herein shown the frame work of the machine is made up of open panels and the forward margin of each balance plane may extend only a portion of the width of a panel as indicated in Fig. 2 or it may span the entire panel as shown in Fig. 3. In either construction the operator by proper manipulation of the steering members may swing the machine on one end as on a pivot, even if the main rudder of the machine is out of order. By simultaneous depression or elevation of the rear edges of the balance planes the machine may be raised or lowered in its flight. If either balance plane is raised or lowered the adjacent portion of the machine is correspondingly depressed or elevated. Furthermore if the machine be swung sharply around in a horizontal plane the outer balance member may be depressed to overcome the effect of inertia which tends to make that portion of the machine dip when swinging around a curve.

While herein shown in combination with a bi-plane it is apparent that the balance and steering planes may be used with a mono-plane type of machine in which instance they can be placed above or below the main plane as preferred.

Obviously, changes in the details of construction may be made without departing from the spirit of the invention and I do not care to limit myself to any particular form or arrangement of parts.

I claim as my invention:

1. The combination in an aeroplane, of main planes with a pair of steering planes symmetrically disposed between the main planes near the extremities thereof, each being angularly adjustable on an axis substantially perpendicular to the main planes, and a pair of balance planes that are each angularly adjustable on an axis that intersects a steering plane axis, the steering planes each being oscillatory in an opening of a companion balance plane.

2. The combination in an aeroplane, of a frame, a pair of main planes on the frame in substantially parallel, spaced relation, a pair of steering planes symmetrically disposed on the frame between the main planes near the extremities of the latter, each angularly adjustable on an axis substantially perpendicular to the main plane, and balance planes each angularly adjustable on an axis that intersects the axis of a steering plane, the balance planes having openings in which the steering planes are oscillatory.

3. In an aeroplane, a main plane, a pair of steering planes each angularly adjustable on an axis that is transverse to the main plane, and balance planes angularly adjustable on axes that are substantially parallel to the forward marginal portion of the main plane, the axes of the steering and balance planes intersecting in pairs and each steering plane being oscillatory in an opening in the companion balance plane.

In testimony whereof I affix my signature in presence of two witnesses.

WALTER L. MARR.

Witnesses:
OTTO F. BARTHEL,
ANNA M. DORR.